(12) United States Patent
Dvir

(10) Patent No.: US 8,515,282 B2
(45) Date of Patent: Aug. 20, 2013

(54) OPTICAL BURST RECEIVER WITH A CONFIGURABLE AC AND DC COUPLING INTERFACE

(75) Inventor: Amiad Dvir, Nes-Ziona (IL)

(73) Assignee: Broadcom Corporation, Irvine, CA (US)

( * ) Notice: Subject to any disclaimer, the term of this patent is extended or adjusted under 35 U.S.C. 154(b) by 323 days.

(21) Appl. No.: 12/967,461

(22) Filed: Dec. 14, 2010

(65) Prior Publication Data

US 2011/0176806 A1  Jul. 21, 2011

Related U.S. Application Data

(60) Provisional application No. 61/297,058, filed on Jan. 21, 2010.

(51) Int. Cl.
*H04B 10/00* (2013.01)
*H04J 14/00* (2006.01)
*H04J 14/02* (2006.01)

(52) U.S. Cl.
CPC ................................. *H04J 14/0282* (2013.01)
USPC ............................................ 398/66; 398/158

(58) Field of Classification Search
USPC ...................... 398/66–68, 158, 159
See application file for complete search history.

(56) References Cited

U.S. PATENT DOCUMENTS

| | | | |
|---|---|---|---|
| 7,599,631 B2 | 10/2009 | Heqing | |
| 8,254,792 B2 * | 8/2012 | Dalton | 398/210 |
| 8,335,235 B2 * | 12/2012 | Davis et al. | 370/474 |
| 2005/0238014 A1 | 10/2005 | Kang | |
| 2009/0103932 A1 | 4/2009 | Yi | |
| 2010/0129072 A1 * | 5/2010 | Yoshiuchi et al. | 398/17 |

* cited by examiner

*Primary Examiner* — Dalzid Singh
(74) *Attorney, Agent, or Firm* — Sterne, Kessler, Goldstein & Fox P.L.L.C.

(57) ABSTRACT

A method for enabling AC coupling or DC coupling when receiving burst data signals comprises generating a hold-over pattern, wherein the hold-over pattern is a AC balanced pattern when an AC coupling is required and a low-logic value signal when a DC coupling is required; inputting the generated hold-over pattern to an AC coupling circuit, when no burst data signal is received; inputting only a received burst data signal to the AC coupling circuit, during the reception of such signal; and upon receiving of the entire burst data signal, generating a reset signal causing to input the generated hold-over pattern to an AC coupling circuit.

20 Claims, 5 Drawing Sheets

Hold Over Pattern

Optical incoming signal

RX Burst Signal

Signal-Detect internal

Signal Detect at the Interface Output

RX_RESET

Differential Signal

T0　　　　　　　　　　　T1　　　　　　　　　T2　T3

OPTICAL BURST RECEIVER WITH A CONFIGURABLE AC AND DC COUPLING INTERFACE

CROSS-REFERENCE TO RELATED APPLICATIONS

This application claims the benefit of U.S. provisional application No. 61/297,058 filed on Jan. 21, 2010, the contents of which are herein incorporated by reference.

TECHNICAL FIELD

The present invention relates generally to receiving high-speed burst data signals in optical networks.

BACKGROUND OF THE INVENTION

Many communication networks that provide high bit-rate transport over a shared medium are characterized by a non-continuous or burst data transmission. A typical PON includes a plurality of optical network units (ONUs) connected to an optical line terminal (OLT) via a passive optical splitter. Traffic data transmission is performed over two optical wavelengths, one for the downstream direction and another for the upstream direction. Thus, downstream transmission from the OLT is broadcast to all ONUs, where each ONU filters its respective data according to, for example, pre-assigned labels. In the upstream direction, an ONU transmits data to the OLT during different time slots allocated by the OLT. Transmission from an ONU to the OLT is in the form of a burst.

An OLT includes an optical transceiver that receives burst data and transmits continuous data. A received burst data signal is preceded by a low-logic value ('0') signal transmitted on the optical line. This is performed mainly to enable the recovery of the received signals and without losing any data bits, as required, for example, by the Gigabit PON (GPON) communication standard.

FIG. 1 shows a schematic diagram of an OLT 100 that includes an optical transceiver 110 and a medium access control (MAC) module 120. A transmitter (not shown) of the optical transceiver 110 generates and transmits optical signals respective of the input data signals. The optical transceiver 110 also includes a burst mode receiver (not shown) that receives burst signals sent from the ONUs. The optical transceiver 110 generates electric digital signals respective of the received burst data signals. The MAC module 120 processes digital electric signals provided by the optical transceiver 110.

The MAC module 120 is a logic component implemented in an integrated circuit (IC). The MAC module 120 and optical transceiver 110 operate at different direct current (DC) levels. Typically, the DC level of the MAC module 120 is significantly lower than the DC level of the optical transceiver 110, in particular, when the size of the IC including the MAC module 110 is designed to support advanced semiconductor fabrication techniques.

The data burst signals output by the optical transceiver 110 are offset by a certain biased DC level, which is typically the operation voltage of the transceiver. However, as the DC level of the MAC module 120 is lower than that of the transceiver 110, the burst signal may not be properly received at the MAC module 120.

Therefore, it would be advantageous to provide a solution for interfacing between the MAC module and the optical transceiver in order to properly receive data burst signals.

SUMMARY OF THE INVENTION

Certain embodiments of the invention include a method for enabling an alternating current (AC) coupling of burst data signals received at an optical line terminal (OLT) operable in a passive optical network (PON). The method comprises generating a hold-over pattern, wherein the hold-over pattern is a AC balanced pattern; inputting the generated hold-over pattern to an AC coupling circuit when no burst data signal is received, wherein the AC coupling circuit interfaces between a medium access control (MAC) module and a burst optical receiver of the OLT; inputting only a received burst data signal to the AC coupling circuit during the reception of the burst signal; and upon receiving of the entire burst data signal generating a reset signal causing to input the generated hold-over pattern to the AC coupling circuit.

Certain embodiments of the invention further include an optical line terminal (OLT) operable in a passive optical network (PON) for at least alternating current (AC) coupling input burst data signals. the OLT comprises an optical transmitter including at least an optical receiver for receiving input burst signals from a plurality of optical network units (ONUs) of the PON; a medium access control (MAC) module for generating at least a hold-over pattern and a reset signal; an AC coupling circuit connected between the optical transmitter and the MAC module for unbiasing direct current (DC) levels of the received input burst data signals; and an AC coupling control circuit for feeding either the hold-over pattern or a received burst signal to the AC coupling circuit based, in part, on the an optical signal-detect signal and reset signal.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
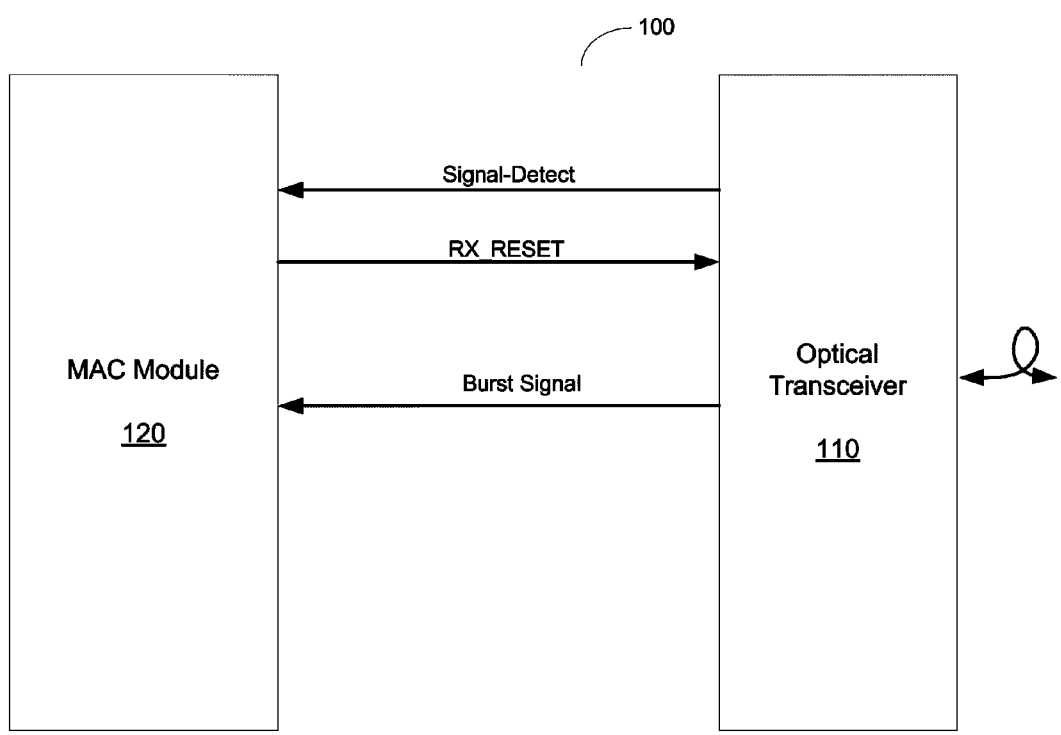
FIG. 1 is a schematic diagram of an OLT.

The embodiments disclosed by the invention are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
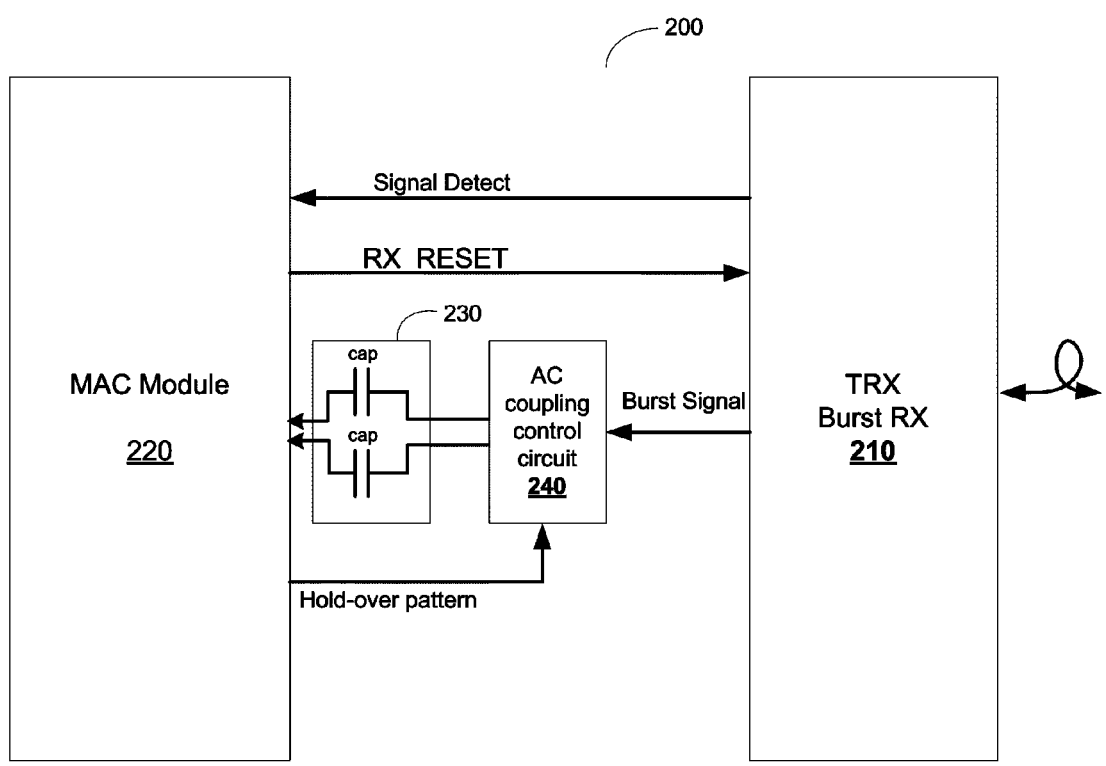
FIG. 2 is a schematic diagram of an OLT including an AC coupling circuit.

FIG. 2 shows a schematic diagram of an OLT 200 implemented in accordance with an embodiment of the invention. The OLT 200 includes an optical transmitter (TRX) 210, a MAC module 220 and an alternating current (AC) coupling circuit 230 coupled between them. That is, the AC coupling circuit 230 is utilized to interface between the MAC module 220 and the optical transceiver 210 in order to remove biased DC levels of received burst data signals. The optical transceiver 210 includes a burst optical receiver and a continuous optical transmitter (both are not shown).

The burst signals are AC balanced within the burst and between bursts, the signal is typically not AC balanced. For example, signals between bursts may include a long string of identical bits. The AC coupling circuit 230 allows for unbiasing the DC level of received data signals, while maintaining the AC swing characteristics of the signals. However, utilizing AC coupling may result in losing data bits, in particular, when a long string of information is repeatedly included in a sequence of identical bits or when an input data signal has not been received for a relatively long period of time (between bursts). This is due to the time required to charge and discharge the capacitors of the AC coupling circuit 230. This problem may be critical in high-speed communication standards, such as, but not limited to, Gigabit PON (GPON) and XGPON (or 10XPON), where the number of allowed identical bits within the received data is bounded. However, when data is transmitted a long string of identical consecutive bits may be generated and received at the burst receiver 210.

In order to eliminate the problems associated with the AC coupling and to ensure that the entire burst signal will be correctly received at the MAC module 220, a data pattern (hereinafter the "hold-over pattern") is generated by the MAC module 220 and input to the AC coupling control circuit 240 when no burst signal is received. The hold-over pattern may have two different forms, which are determined according to the desired coupling. Specifically, to achieve an efficient AC coupling the hold-over pattern is an AC balanced pattern, for example, a sequence of alternating '0' bit and '1' bit or a 50% duty-cycle clock signal. In this configuration, the hold-over pattern is input to the circuit 230 only when no burst data signal is received. This is accomplished using an AC coupling control circuit 240 which is further depicted in FIG. 3. To configure the AC coupling circuit 230 to function as a DC coupling interface, the hold-over pattern is set to a low-logic value ('0') signal.

Figure 3:
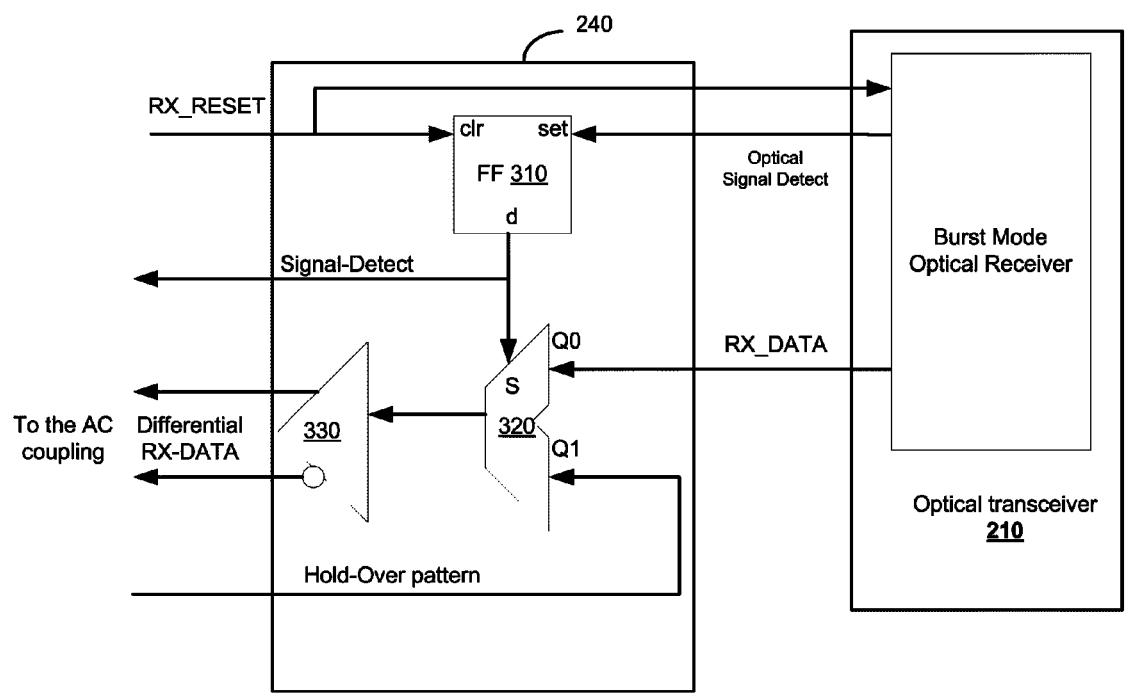
FIG. 3 is an AC coupling control circuit constructed in accordance with an embodiment of the invention.

FIG. 3 shows a schematic diagram of the AC coupling control circuit 240 constructed in accordance with an embodiment of the invention. The control circuit 240 includes a flip-flop 310, a multiplexer (MUX) 320, and a differential amplifier 330 that outputs a differential signal based on an input received from the MUX 320. The inputs of the MUX 320 are the received burst data signal (at input Q0) and the hold-over pattern (at input Q1), the selection of the input is based on the signal at the select input (S). Specifically, when the output (d) of the flip-flop 310 is set (i.e., '1'), the input Q0 of the MUX is selected and when the output (d) is clear (i.e., '0'), the input Q1 is selected.

The flip-flop 310 is set when a Signal-Detect signal is asserted by the optical transceiver 210, usually when energy of an incoming signal is detected by the receiver of the transceiver 210. That is, as long as the Signal-Detect signal is active, the received burst signal is sent to the AC coupling circuit 230. The flip-flop 310 is cleared when an RX_RESET signal is asserted by the MAC module 220. This signal is output when the complete burst signal has been received. In another embodiment, the MAC module 220 outputs the RX_RESET signal during a ranging process of the PON or when a received signal is determined to be faulty. Once the RX_RESET is asserted, the hold-over pattern is input to the AC coupling circuit 230. The hold-over pattern is generated by the MAC module 220.

Figure 4:
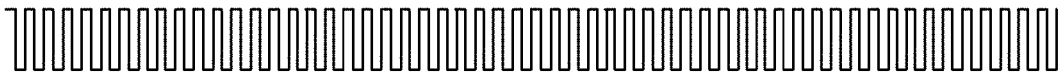
FIG. 4 illustrates the operation of the AC coupling control circuit.
Figure 4:
Figure 4:
Figure 4:
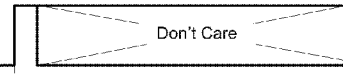
Figure 4:
Figure 4:
Figure 4:
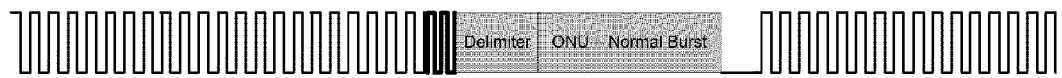

The operation of the AC coupling control circuit 240 is further illustrated in FIG. 4. In the AC coupling mode of operation, the hold-over pattern is an AC balanced pattern that is continuously generated by the MAC module 220. The optical incoming signal is the signal as received from an ONU at the input of the optical transceiver 210. The burst signal is an output signal of a burst mode receiver in the transceiver 210. The optical Signal-Detect is also an output of the receiver and it is typically active (i.e., at a '1' value) for the duration of the presence of a training sequence (preamble) or a similar pattern in the receiver, or the presence of incoming optical energy above a predefined level. In accordance with an embodiment of the invention, the Signal-Detect can be held at its active value by the flip-flop 310 until released by the RX_RESET signal.

In the exemplary diagrams shown in FIG. 4, there is no alignment between the incoming optical signal and the optical Signal-Detect signal. The RX_RESET is as generated by the MAC module 220 and is essential for the realization of a proper AC coupling mechanism. The differential signal is the output of the differential amplifier 330, and it is being input to the AC coupling circuit 230.

During the time interval of T0 to T1, the differential signal consists of the hold-over pattern as no incoming signal is received. At T1, the optical Signal-Detect is asserted. The optical Signal-Detect is being held at a high-logic value by the flip-flop 310 until T3. As a result, an output signal of the burst mode receiver is input to the differential amplifier 330 and the differential signal consists of the received burst signal for the duration between T1 and T2. At T3 the RX_RESET signal is asserted causing the MUX 320 to output the hold-over pattern to the differential amplifier 330. Thus, from T3 until a new burst signal is received the differential signal consists of the hold-over pattern.

It should be noted that the burst signals transmitted by ONUs are scrambled signals using a polynomial method, thus having AC balanced properties. The hold-over pattern is also AC balanced, thus the differential signal, consisting of the hold over and the Burst data, have a good AC balance properties. Therefore, it is possible to pass the differential signal through the AC coupling circuit 230 without altering received burst signals or losing information contained in the received burst signals. In addition, capacitors of the AC coupling circuit 230 are chosen to have capacity values that will ensure proper signal integrity regardless of the physical characteristics of the PON (e.g., max CID, control delays, etc.).

In accordance with an embodiment of the invention, the OLT 200 can be configured to allow DC coupling without redesigning the OLT 200. This is performed by setting the MAC module 220 to generate a hold-over pattern that consists of only a low-logic value ('0) signal. In this embodiment, the operation of the AC coupling control circuit 240 is as described above.

Figure 5:
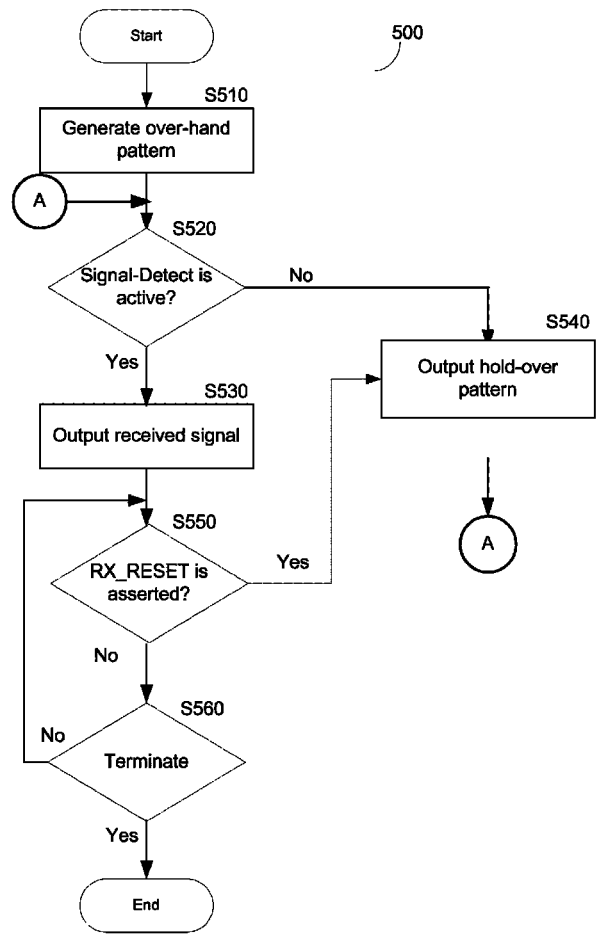
FIG. 5 is a flowchart describing a method for enabling AC coupling or DC coupling when receiving burst data signals.

FIG. 5 shows an exemplary and non-limiting flowchart 500 describing the method for enabling AC coupling or DC coupling when receiving burst data signals. At S510, a hold-over pattern is generated. The method can be utilized to allow an OLT-transceiver that includes an AC coupling circuit to perform as either an AC coupling or DC coupling interface. When an AC coupling is utilized, the hold-over pattern is an AC balanced pattern. In a DC interface configuration, the hold-over pattern is a low-logic value signal or can simply be tied to GND and VCC of the MAC module. It should be noted that the decision whether to operate in an AC or DC coupling mode depends on the DC level of the MAC module with respect to the transceiver. For example, when the DC level of the MAC module is lower than that of the transceiver, then AC coupling mode is applied; otherwise, DC coupling may be utilized.

At S520 it is checked if the optical Signal-Detect signal is active, and if so at S530 a received burst signal is output, otherwise, at S540 the hold-over pattern is output, and thereafter execution returns to S520. Both the received burst signal and the pattern are fed into an AC coupling circuit, depending on the state of the Signal-Detect. At S550, a check is made to determine if the RX_RESET signal is asserted, and if so execution continues with S540; otherwise, at S560 it is checked if the execution should be terminated, for example, when shutting down the OLT. If S560 results with a negative answer execution returns to S550.

The principles of the invention described herein are particularly useful in OLTs operable in PON communication standard, including but not limited to, GPON and XGPON (or 10XPON) where data bits of received signals cannot be lost or modified. It should be appreciated by one of ordinary skill in the art that the principles of the invention can be utilized to design OLT with either an AC or DC coupling interface.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for enabling an alternating current (AC) coupling of burst data signals received at an optical line terminal (OLT), wherein the OLT comprises a medium access control (MAC) module, a burst optical receiver, an AC coupling circuit and an AC coupling control circuit, and is operable in a passive optical network (PON), the method comprising:
generating, utilizing the MAC module, an AC balanced hold-over pattern;
inputting the generated AC balanced hold-over pattern to the AC coupling circuit in the absence of a burst data signal being received by the AC coupling control circuit, wherein the AC coupling circuit and the AC coupling control circuit are connected between the MAC module and the burst optical receiver;
inputting a received burst data signal to the AC coupling circuit during the reception of the received burst data signal by the AC coupling control circuit; and
generating, utilizing the MAC module, a reset signal to control the AC coupling control circuit to input the generated AC balanced hold-over pattern to the AC coupling circuit, wherein the reset signal is generated following receipt of the received burst data signal.

2. The method of claim 1, wherein a determination of whether the burst data signal has been received is based on an optical signal-detect signal generated by the burst optical receiver.

3. The method of claim 1, wherein the reset signal is further generated when a ranging process of the OLT ends.

4. The method of claim 1, wherein the AC balanced hold-over pattern is an alternating sequence of low-logic value and high-logic value bits, or a 50% duty-cycle clock signal.

5. The method of claim 1, further comprising:
DC coupling burst data signals by setting the AC balanced hold-over pattern to a low-logic value signal.

6. The method of claim 5, wherein the burst data signals are DC coupled when a DC level of the MAC module is greater than or equal to a DC level of the burst optical receiver.

7. The method of claim 1, wherein the PON comprises at least one of:
a Gigabit PON and a 10XPON.

8. The method of claim 1, wherein the PON comprises at least one of: a Gigabit PON and a XGPON.

9. A non-transitory computer readable medium having stored thereon instructions for causing one or more processing units to execute a process for enabling an alternating current (AC) coupling of burst data signals received at art optical line terminal (OLT), wherein the OLT comprises a medium access control (MAC) module, a burst optical receiver, an AC coupling circuit and an AC coupling control circuit, and is operable in a passive optical network (PON), the process comprising:
instructing the MAC module to generate an AC balanced hold-over pattern;
inputting, in the absence of a burst data signal being received by the AC coupling control circuit, the generated AC balanced hold-over pattern to the AC coupling circuit;
inputting, during reception of a received burst data signal by the AC coupling control circuit, the received burst data signal to the AC coupling circuit; and
instructing the MAC module to generate a reset signal to control the inputting of the generated AC balanced hold-over pattern to the AC coupling circuit, wherein the reset signal is generated following receipt of the received burst data signal.

10. An optical line terminal (OLT) operable in a passive optical network (PON) and configured to perform alternating current (AC) coupling of input burst data signals, the OLT comprising:
an optical transceiver configured to receive input burst data signals from a plurality of optical network units (ONUs) of the PON;
a medium access control (MAC) module configured to generate a hold-over pattern and a reset signal;
an AC coupling circuit, connected between the optical transceiver and the MAC module, configured to unbias direct current (DC) levels of the received input burst data signals; and
an AC coupling control circuit configured to feed to hold-over pattern or a received burst data signal to the AC coupling circuit based on an optical signal-detect signal and the reset signal.

11. The OLT of claim 10, wherein the hold-over pattern is an AC balanced hold-over pattern.

12. The OLT of claim 11, wherein the AC balanced hold-over pattern is an alternating sequence of low-logic value and high-logic value bits, or a 50% duty-cycle clock signal.

13. The OLT of claim 10, wherein the AC coupling control circuit comprises;
   a flip-flop configured to generate a selection signal based on the reset signal and the optical signal-detect signal;
   a multiplexer configured to select between a first input including the hold-over pattern and a second input including the received burst data signal based on the selection signal generated by the flip-flop; and
   a differential amplifier connected to an output of the multiplexer, the differential amplifier being configured to generate a difference signal based on a signal fed from the multiplexer.

14. The OLT of claim 13, wherein the multiplexer is configured to output the received burst data signal during the reception of the received burst data signal and to output the hold-over pattern when the reset signal is asserted.

15. The OLT of claim 14, wherein the reset signal is asserted when an entire burst data signal is received or a ranging process of the OLT has completed.

16. The OLT of claim 14, wherein the MAC module is further configured to set the hold-over pattern to a low-logic value signal.

17. The OLT of claim 16, wherein the hold-over pattern is set to a low-logic value signal when a DC level of the MAC module is greater than or equal to a DC level of the optical transceiver.

18. The OLT of claim 13, wherein the AC coupling circuit further comprises first and second capacitors configured in parallel.

19. The OLT of claim 18, wherein the difference signal comprises an output signal and an inverted signal that is the inverse of the output signal, wherein the first capacitor is configured to receive the output signal and the second capacitor is configured to receive the inverted signal.

20. The OLT of claim 10, wherein the optical transceiver farther comprises a continuous optical transmitter.

* * * * *

UNITED STATES PATENT AND TRADEMARK OFFICE
CERTIFICATE OF CORRECTION

PATENT NO. : 8,515,282 B2
APPLICATION NO. : 12/967461
DATED : August 20, 2013
INVENTOR(S) : Dvir Page 1 of 1

It is certified that error appears in the above-identified patent and that said Letters Patent is hereby corrected as shown below:

In the Claims

Claim 9, Column 6, Line 29, please replace "art" with --an--.

Signed and Sealed this
Fifteenth Day of October, 2013

Teresa Stanek Rea
*Deputy Director of the United States Patent and Trademark Office*